United States Patent [19]

Tausig et al.

[11] 4,168,729
[45] Sep. 25, 1979

[54] UNDERWATER SELF-GRIPPING PILE CUTTING DEVICE

[75] Inventors: Wayne R. Tausig, Oxnard; Robert N. Cordy, Ventura, both of Calif.

[73] Assignee: The United States of America as represented by the Secretary of the Navy, Washington, D.C.

[21] Appl. No.: 852,119

[22] Filed: Nov. 16, 1977

[51] Int. Cl.² ............................................. A01G 23/08
[52] U.S. Cl. ..................................... 144/34 E; 30/228; 83/559; 83/600; 83/694
[58] Field of Search .......................... 30/228, 244, 245; 83/374, 694, 559, 567, 382, 648, 600; 144/2 Z, 3 D, 34 R, 34 E, 309 AC, 2 R

[56] References Cited

U.S. PATENT DOCUMENTS

| | | | |
|---|---|---|---|
| 2,565,252 | 8/1951 | McFaull | 144/34 E |
| 2,846,175 | 8/1958 | Sexton | 144/34 R X |
| 2,981,301 | 4/1961 | Busch et al. | 144/34 E |
| 3,056,267 | 10/1962 | McRee | 144/34 E X |
| 3,294,131 | 12/1966 | Larson | 144/34 E |
| 3,482,613 | 12/1969 | Jordan | 144/34 E |
| 3,667,515 | 6/1972 | Corey | 144/34 E |
| 3,707,175 | 12/1972 | Propst | 144/3 D |
| 3,831,647 | 8/1974 | Windsor | 144/34 E |
| 3,837,382 | 9/1974 | Gaitten | 144/34 E |
| 3,862,652 | 1/1975 | Johnson | 144/34 E |
| 3,918,476 | 11/1975 | Jasinski | 144/3 D |

FOREIGN PATENT DOCUMENTS 245478  11/1969  U.S.S.R. ................................ 144/34 E

*Primary Examiner*—Donald R. Schran
*Assistant Examiner*—W. D. Bray
*Attorney, Agent, or Firm*—Richard S. Sciascia; Joseph M. St.Amand

[57] ABSTRACT

A self-gripping scissors-type shear cutting device for pile cutting. The shear blades of this cutting device have spikes located on the blades which automatically grip and hold the wood pile being cut, thus preventing slipping or squeeze-off of the work to be severed. This device avoids the use or need for additional clamping or gripping arrangements to hold the cutting blades against the pile to prevent slipping.

21 Claims, 5 Drawing Figures

UNDERWATER SELF-GRIPPING PILE CUTTING DEVICE

BACKGROUND OF THE INVENTION

This invention relates to pile cutters and more particularly to a self-gripping scissors-type shear cutter assembly for cutting piles.

Underwater removal of wood piles has always been a difficult problem in waterfront maintenance and clearance projects. Typical pile removal methods are time consuming, hazardous, and often require large support equipment. Removal of wooden piles from waterfront structures during demolition or repair is normally accomplished by one of two methods. The first method is to remove the pile by pulling on it with a heavy crane. This is done by either using the crane to extract the pile until it breaks off at the mudline. This method limits the operation to work locations accessible by crane.

The second method is to physically cut the pile off at the mudline. Blasting, sawing, and shearing are common techniques used for cutting.

Shear type cutters operate by sliding two blades together in either a sliding guillotine motion or scissors type motion. The shear type cutter has several distinct advantages over blasting or the chain and reciprocating saws: since there are no high speed rotating or reciprocating blades, the shear type cutter is safer to operate; if designed properly, the shear type cutter never needs readjustment; wear rate on shear type cutters is low.

However, prior type shear cutters, such as those types used using scissor type blades for tree harvesting purposes have a tendency to slip or squeeze-off the tree during the cutting process and require apparatus with separate clamping means in addition to the cutting blades for gripping or holding the cutting blades against the workpiece during cutting operations. Some commercially available tree shearers are normally mounted for hydraulic operation on a bulldozer and use the weight and mass of the bulldozer to hold the blades against a tree to be cut. For underwater pile cutting a simpler device to prevent squeezing-off is necessary.

SUMMARY

The present invention overcomes the disadvantages of prior type devices by providing a shear cutter assembly with self-gripping teeth or spikes incorporated as part of the cutting blades to hold the pile and prevent slipping during cutting operations. An hydraulic operated scissor-type cutter blade assembly is provided with hardened steel spikes that extend beyond the edge of the blades to grip the pile. As the blades close about the pile the spikes bite into the timber and keep the blades from squeezing off the pile. The present invention provides a safe and reliable pile cutter tool for use by construction divers in a marine environment. This tool has ruggedness for heavy workloads and ease in maintenance.

DESCRIPTION OF THE PREFERRED EMBODIMENT

Figure 1:
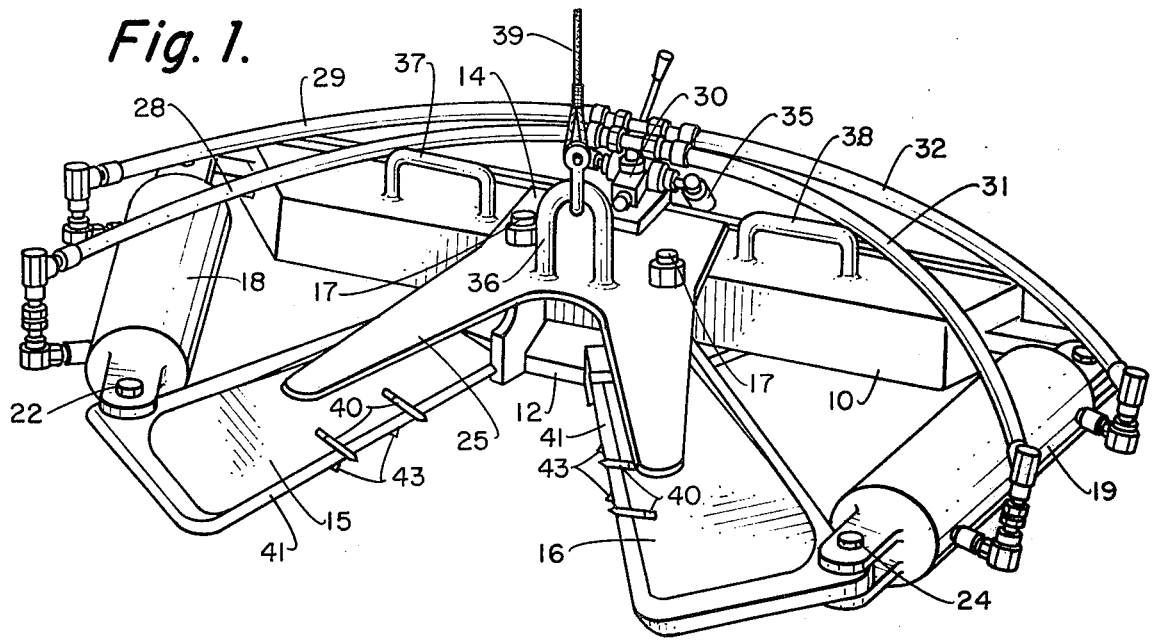
FIG. 1 is a view of a preferred embodiment of the self-gripping pile cutter assembly of the present invention shown with the blades in open position.
Figure 2:
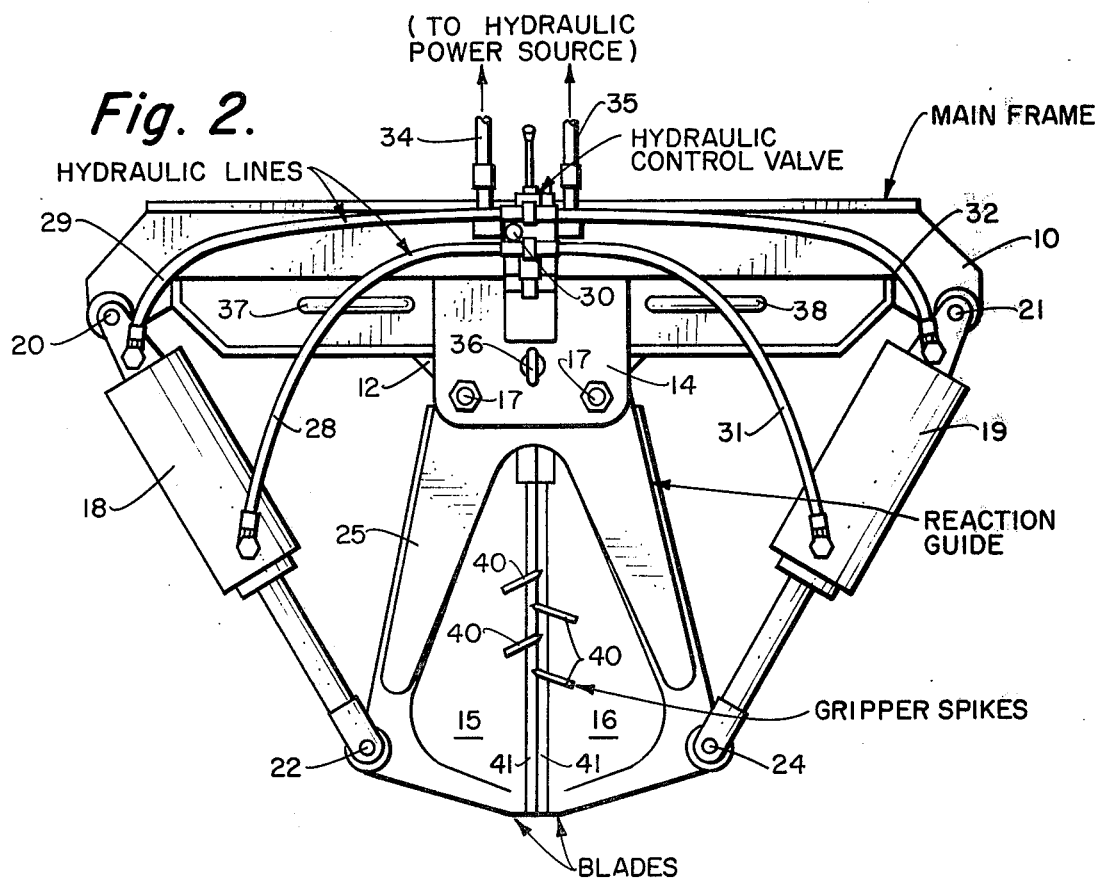
FIG. 2 shows a planar view of the assembly of FIG. 1 with the blades in closed position.

Referring now to the drawings, FIGS. 1 and 2 show the hydraulic pile cutter assembly. The assembly includes an elongated main frame, indicated generally on 10, having at one side of the center area a bottom tongue-shaped plate 12 and a somewhat similar upper tongue-shaped plate 14 between which the ends of two shear blades 15 and 16 are pivotally mounted with pivot pins 17. One end of each of a pair of hydraulically operated piston units 18 and 19 are pivotally attached, at opposite ends respectively of the main beam 10, by pivot pins 20 and 21 as shown. The other ends of hydraulic pistons 18 and 19 are pivotally connected with pivot pins at 22 and 24 to the outer ends of shear blades 15 and 16 respectively. The leading or cutting edges of shear blades 15 and 16 are in contact with each other when in a closed position as shown in FIG. 2.

A reaction guide 25 is mounted on upper tongue-shaped plate 14. Reaction guide 25 helps position the pile between the cutter blades of the assembly when the assembly is being positioned about a pile workpiece, or the like, to be cut, and is used primarily to prevent the cutter assembly from rotating about the circumference of the pile when the hydraulic pistons are operated during cutting operations.

Flexible hydraulic lines 28 and 29 connect hydraulic piston unit 18 to a hydraulic control valve 30. Likewise hydraulic lines 31 and 32 connect hydraulic piston unit 19 to the hydraulic control valve 30. Hydraulic lines 34 and 35 in turn connect hydraulic control valve 30 to a hydraulic power source. Control valve 30 can be placed on frame 10, as shown, for diver control, or at the power source and controlled at the surface, as desired. Loops 36, 37 and 38 are formed on frame 10 for raising and lowering the assembly by means of a cable attachment 39 and for use as positioning handles, respectively.

Figure 3:
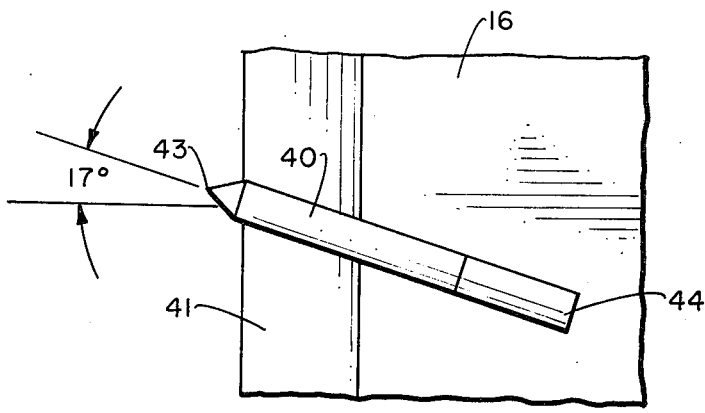
FIG. 3 shows in detail one of the spikes on a cutting blade.
Figure 4:
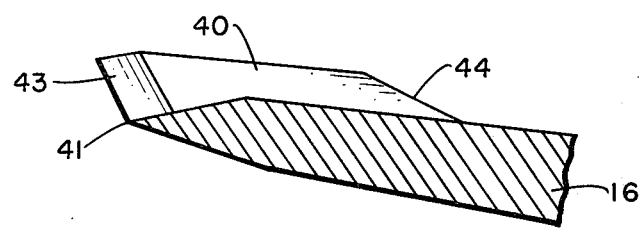
FIG. 4 is a partial cross-section of the view shown in FIG. 3.

As can be seen in FIGS. 1 and 2, hardened steel spikes 40 are welded above and below cutter blades 15 and 16, in a manner as shown in detail in FIGS. 3 and 4. The steel spikes 40 extend out beyond the cutting edges 41 of the cutter blades for a short distance (such as ¼ inch for example) and operate to initially grip the pile. The leading tips 43 of spikes 40 are ground to a cutting edge similar in shape to the bow of a ship. When the shear blades are in a closed position, as shown in FIG. 2, the spike tips overlap the cutting edges of opposing shear blades. The trailing end 44 of the spikes are tapered down to be flush with the cutter blade surface as shown in FIG. 4. Spikes 40 are mounted on the blades at an optimum angle so that they will penetrate into the timber pile at a tangent to the radial cutting direction. The spikes themselves actually cut into the pile along with the blade during the entire cutting process and do not merely act as a grip to hold the pile. The spikes 40 which extend beyond the cutting edges 41 are mounted both above and below each of blades 15 and 16 and overlap the cutting edges of opposing blades when in the closed position as shown in FIG. 2.

During pile cutting operations, divers merely have to position the pile cutter assembly with shear blades in open position, as shown in FIG. 1, adjacent to a timber pile, and activate the hydraulic pistons. As the blades being closing on the pile, and before the blades can slip or squeeze-off the pile, the extended gripper spikes "bite" into the timber. The angle of the spikes (17° for example) allow the tips to penetrate easily into the timber pile while the side edges of the spikes keep the blades from squeezing off the pile. This device permits the pile to be cut off with a complete clean cut. After the cut is completed, the tapered trailing edges 44 of spikes 40 allow the blades 15 and 16 to open easily.

This invention allows a scissors-type cutter to grip itself onto the timber workpiece without the need for heavy clamps or hydraulic grabbers. The self-gripping blades of this device have provided essentially a diver "hand-held" underwater tool for what otherwise would normally require the weight and mass of a bulldozer to hold in place.

Figure 5:
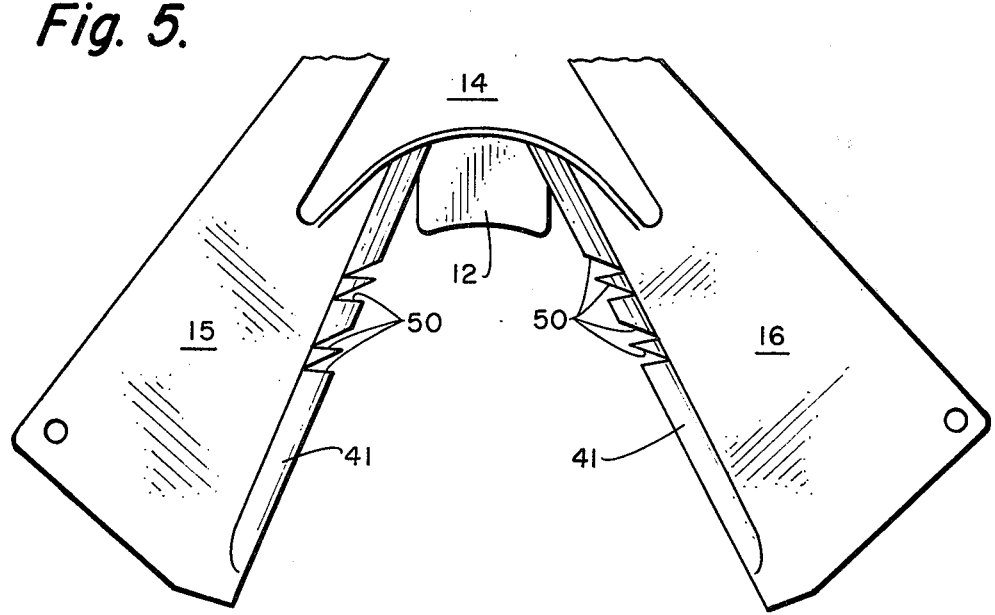
FIG. 5 shows an assembly with alternate blade design having self-gripping notches.

Alternative designs for the spikes and number thereof may also be used as part of the cutter blades of this invention. Also, notches 50 in the cutter blade, such as shown in FIG. 5, can be used if desired. The notches will bite easily into the pile during cutting operation and prevent the blades from squeezing off the pile. However, when the blades are completely closed, the notches will leave small gaps of uncut wood fibers so as to prevent a complete cut. These uncut wood fibers can be broken as the pile is removed, but the spiked blade concept of FIGS. 1-4 works extremely well and is preferred.

Obviously many modifications and variations of the present invention are possible in the light of the above teachings. It is therefore to be understood that within the scope of the appended claims the invention may be practiced otherwise than as specifically described.

I claim:

1. A self-gripping underwater pile cutting device, comprising:
   a. an assembly frame;
   b. a pair of opposing shear blades each having one end thereof pivotally mounted on said assembly frame and operable to be moved in a scissor-type action;
   c. means connected between each of said pair of opposing shear blades and said assembly frame for moving said shear blades in opposing scissor-type movement when actuated;
   d. a plurality of gripping means mounted on and forming a portion of said shear blades; said gripping means comprising self-clamping teeth which extend outward beyond the leading cutting edges of each of said opposing shear blades;
   e. said shear blades when in an open position being operable to be positioned adjacent to a timber pile to be cut;
   f. said gripping means portion of said shear blades being operable to grip a timber pile and prevent squeezing-off of the pile during cutting operations as said shear blades are actuated to move to a closed position.

2. An apparatus as in claim 1 wherein the cutting edges of said opposing shear blades are in contact with each other when said shear blades are in a closed position.

3. An apparatus as in claim 1 wherein said gripping means overlap the cutting edges of said opposing shear blades when in a closed position.

4. An apparatus as in claim 1 wherein said gripping means are spikes which grip the pile prior to cutting by the leading cutting edges of said shear blades.

5. An apparatus as in claim 4 wherein said spikes are positioned at an optimum angle to penetrate the timber pile at a tangent to the radial cutting direction.

6. An apparatus as in claim 5 wherein said optimum angle is 17 degrees.

7. An apparatus as in claim 4 wherein the extended edges of said gripping means are sharpened to a cutting edge and the opposite ends of said gripping means have a trailing edge which allows the shear blades to be opened easily.

8. An apparatus as in claim 1 wherein said gripping means are notches and teeth along the leading edge of said shear blades.

9. An apparatus as in claim 1 wherein means for moving said shear blades is hydraulic means operable to be actuated both from underwater and above the water surface.

10. An apparatus as in claim 1 wherein said gripping means are positioned at an optimum angle to penetrate a timber pile at a tangent to the radial cutting direction.

11. An apparatus as in claim 1 wherein reaction guide means is provided on said frame to prevent rotation of the assembly about a pile during cutting operations as said shear blades are closed and opened.

12. An apparatus as in claim 1 wherein said frame is provided with means for positioning the assembly adjacent a pile.

13. An apparatus as in claim 1 wherein said gripping means include both notches and teeth along the leading edges of said shear blades.

14. A self-gripping underwater pile cutting device, comprising:
   a. a pair of opposing shear blades operable to be moved in a scissor-type action;
   b. means operable for moving said shear blades in opposing scissor-type movement when actuated;
   c. a plurality of spike-like gripping means mounted on and forming a portion of said shear blades; said gripping means extending out beyond the leading cutting edges of each of said opposing shear blades and positioned at an optimum angle to penetrate a timber pile at a tangent to the radial cutting direction of said shear blades;
   d. said shear blades when in an open position being operable to be positioned adjacent to a timber pile to be cut;
   e. said gripping means being operable to grip a timber pile immediately prior to cutting by the leading cutting edges of said shear blades for preventing slipping and squeezing-off of the pile during cutting operations as said shear blades are actuated to move to a closed position.

15. An apparatus as in claim 14 wherein said gripping means are mounted both above and below the cutting edges of said opposing shear blades and overlap the cutting edges of said opposing shear blades when in a closed position; said spike-like means have a trailing edge which allows the shear blades to be opened easily.

16. An apparatus as in claim 14 wherein said shear blades leading edges include notches and teeth for gripping the pile.

17. A self-gripping underwater pile cutting device, comprising:
   a. an assembly frame;
   b. a pair of opposing shear blades each having one end thereof pivotally mounted on said assembly frame and operable to be moved in a scissor-type action;

c. means connected between each of said pair of opposing shear blades and said assembly frame for moving said shear blades in opposing scissor-type movement when actuated;
d. a plurality of gripping means mounted on and forming a portion of said shear blades; said gripping means comprising self-clamping teeth along the leading cutting edges of each of said opposing shear blades;
e. said gripping means being mounted both above and below the cutting edges of said opposing shear blades;
f. said shear blades when in an open position being operable to be positioned adjacent to a timber pile to be cut;
g. said gripping means portion of said shear blades being operable to grip a timber pile and prevent squeezing-off of the pile during cutting operations as said shear blades are actuated to move to a closed position.

18. An apparatus as in claim 17 wherein said gripping means are spikes which grip the pile prior to cutting by the leading cutting edges of said shear blades.

19. An apparatus as in claim 18 wherein said spikes are positioned at an optimum angle to penetrate the timber pile at a tangent to the radial cutting direction.

20. An apparatus as in claim 18 wherein the extended edges of said spikes are sharpened to a cutting edge and the opposite ends of said spikes have a trailing edge which allows the shear blades to be opened easily.

21. An apparatus as in claim 18 wherein said gripping means also includes both notches and teeth along the leading edges of said shear blades.

* * * * *